(12) United States Patent
Auerbach et al.

(10) Patent No.: US 8,205,203 B2
(45) Date of Patent: Jun. 19, 2012

(54) SCHEDULING FOR REAL-TIME GARBAGE COLLECTION

(75) Inventors: Joshua Seth Auerbach, Ridgefield, CT (US); David Francis Bacon, New York, NY (US); Perry Cheng, New York, NY (US); David Paul Grove, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 12/252,780

(22) Filed: Oct. 16, 2008

(65) Prior Publication Data

US 2010/0107168 A1    Apr. 29, 2010

(51) Int. Cl.
*G06F 9/48* (2006.01)
*G06F 9/50* (2006.01)

(52) U.S. Cl. .................. 718/102; 718/103; 718/104
(58) Field of Classification Search .................. 718/102, 718/103, 104
See application file for complete search history.

(56) References Cited

U.S. PATENT DOCUMENTS

| | | | |
|---|---|---|---|
| 6,349,314 B1 * | 2/2002 | Patel | 1/1 |
| 6,470,376 B1 * | 10/2002 | Tanaka et al. | 718/108 |
| 6,567,839 B1 * | 5/2003 | Borkenhagen et al. | 718/103 |
| 7,392,269 B2 * | 6/2008 | Chauvel | 707/700 |
| 7,562,181 B2 * | 7/2009 | Sinclair et al. | 711/103 |
| 7,624,137 B2 * | 11/2009 | Bacon et al. | 1/1 |

(Continued)

FOREIGN PATENT DOCUMENTS

JP    2000339214 A    * 12/2000

OTHER PUBLICATIONS

A.W. Appel et al., "Real-Time Concurrent Collection on Stock Multiprocessors," Proc. of the SIGPLAN Conference on Programming Language Design and Implementation (PLDI), Jun. 1988, 23, 7, Atlanta, Georgia.

(Continued)

*Primary Examiner* — Aimee Li
(74) *Attorney, Agent, or Firm* — Louis J. Percello; Ryan, Mason & Lewis, LLP (57) ABSTRACT

Techniques are disclosed for schedule management. By way of example, a method for managing performance of tasks in threads associated with at least one processor comprises the following steps. One or more units of a first task type are executed. A count of the one or more units of the first task type executed is maintained. The count represents one or more credits accumulated by the processor for executing the one or more units of a first task type. One or more units of a second task type are executed. During execution of the one or more units of a second task type, a request to execute at least one further unit of the first task type is received. The amount of credits in the count is checked. When it is determined that there is sufficient credit in the count, the request to execute the at least one further unit of the first task type is forgone, and execution of the one or more units of the second task type continues. When it is determined that there is insufficient credit in the count, the at least one further unit of the first task type is executed. The first task type may be an overhead task type such as a garbage collection task type, and the second task type may be an application task type.

18 Claims, 5 Drawing Sheets

U.S. PATENT DOCUMENTS

| | | | |
|---|---|---|---|
| 7,672,983 B2 * | 3/2010 | Printezis et al. | 707/813 |
| 7,702,663 B2 * | 4/2010 | Bacon et al. | 707/813 |
| 7,747,659 B2 * | 6/2010 | Bacon et al. | 707/816 |
| 7,756,911 B2 * | 7/2010 | Bacon et al. | 707/813 |
| 7,765,550 B2 * | 7/2010 | Gootherts et al. | 718/103 |
| 7,984,083 B2 * | 7/2011 | Bacon et al. | 707/816 |
| 7,996,446 B2 * | 8/2011 | Bacon et al. | 707/816 |
| 8,108,859 B2 * | 1/2012 | Yokoi et al. | 718/100 |
| 2004/0024798 A1 * | 2/2004 | Chauvel | 707/206 |
| 2005/0149346 A1 | 7/2005 | Arnold et al. | |
| 2005/0149585 A1 | 7/2005 | Bacon et al. | |
| 2005/0149587 A1 | 7/2005 | Bacon et al. | |
| 2005/0149589 A1 | 7/2005 | Bacon et al. | |
| 2005/0149686 A1 | 7/2005 | Bacon et al. | |
| 2006/0294165 A1 | 12/2006 | Bacon et al. | |
| 2007/0033240 A1 * | 2/2007 | Barsness et al. | 707/206 |
| 2007/0101338 A1 * | 5/2007 | Heddaya et al. | 718/104 |
| 2007/0192388 A1 * | 8/2007 | Kwon | 707/206 |
| 2009/0013017 A1 * | 1/2009 | Branda et al. | 707/206 |

OTHER PUBLICATIONS

J. Auerbach et al., "Real-Time Music Synthesis in Java Using the Metronome Garbage Collector," Proc. International Computer Music Conference, Lecture Notes in Computer Science, 2007, pp. 1-8, Demmark.

J. Auerbach et al., "Java takes Flight: Time-Portable Real-Time Programming with Exotasks," Proc. of LCTES, SIGPLAN Notices, Jun. 2007, pp. 1-12, 42, 7, California.

J. Auerbach et al., "Design and Implementation of a Comprehensive Real-Time Java Virtual Machine," Proc. of EMSOFT, Sep.-Oct. 2007, pp. 249-258, Austria.

D.F. Bacon et al., "On-Line Visualization and Analysis of Real-Time Systems with TuningFork," Compiler Construction, Lecture Notes in Computer Science, Springer-Verlag, pp. 96-100, vol. 3923, Austria.

D.F. Bacon et al., "Syncopation: Generational Real-Time Garbage Collection in the Metronome," Proc. of LCTES, Jun. 2005, pp. 183-192, Illinois.

D.F. Bacon et al., "A Real-Time Garbage Collector with Low Overhead and Consistent Utilization," Proc. POPL. SIGPLAN Notices, Jan. 2003, pp. 285-298, 38, 1, Louisiana.

H.G. Baker, List Processing in Real-Time on a Serial Computer, Commun, ACM 21, Apr. 4, 1978, pp. 280-294.

BEA, BEA WebLogic Real Time: Predictable Mission-Critical Performance for Java—Today, White paper, www.bea.com, Jan. 2006, 11 pages.

R. Buyya et al., "Economic Models for Resource Management and Scheduling in Grid Computing," Concurrency and Computation: Practice and Experience, 2002, pp. 1507-1542, 14.

P. Cheng, "Scalable Real-Time Parallel Garbage Collection for Symmetric Multiprocessors," PhD thesis, Carnegie-Mellon Univ., Sep. 2001, 152 pages.

P. Cheng et al., "A Parallel, Real-Time Garbage Collector," Proc. PLDI, SIGPLAN Notices, Jun. 2001, pp. 125-136, 36, 50, Utah.

C. Click et al., "The Pauseless GC Algorithm," Proceedings of the 1st ACM/USENIX international Conference on Virtual Execution Environments, VEE, 2005, pp. 46-56, Illinois.

S. Davari et al., Sources of Unbounded Priority Inversions in Real-Time Systems and a Comparative Study of Possible Solutions, SIGOPS Oper. Syst. Rev. 1992, pp. 110-120, 26, 2.

D. Doligez et al., "Portable, Unobtrusive Garbage Collection for Multiprocessor Systems," POPL, 1994, pp. 70-83, Oregon.

R. Henriksson, "Scheduling Garbage Collection in Embedded Systems," PhD thesis, Lund Institute of Technology, Jul. 1998, 174 pages.

B.W. Lampson et al., "Experience with Processes and Monitors in Mesa," Communications of the ACM, Feb. 1980, pp. 105-117, vol. 23, No. 2.

B.D. Marsh et al., "First-Class User-Level Threads," SIGOPS Oper. Syst., 1991, pp. 110-121, Rev. 25, 5.

B. McCloskey et al., "Staccato: A Parallel and Concurrent Real-Time Compacting Garbage Collector for Multiprocessors," Tech. Rep., IBM Research, RC24504, Feb. 2008, 11 pages.

G. Naeser, "Priority Inversion in Multi Processor Systems Due to Protected Actions," Ada Letters, vol. XXV, No. 1 Mar. 2005, pp. 43-47.

S. Nettles et al., "Real-Time Garbage Collection," Proc. SIGPLAN Conference on Programming Language Design and Implementation, SIGPLAN Notices, Jun. 1993, pp. 217-226, 28, 6, New Hampshire.

F. Pizlo et al., An Emprical Evaluation of Memory Management alternatives for real-time Java. In Proc. 27th IEEE International Real-Time Systems Symposium (2006), pp. 35-46.

V. Prasad et al., "Locating System Problems Using Dynamic Instrumentation," Linux Symposium (2005), pp. 49-64, vol. 2.

D.C. Schmidt et al., "Software Architectures for Reducing Priority Inversion and Non-Determinism in Real-Time Object Request Brokers," Real-Time Syst. 21, 2001, pp. 1-21.

L. Sha et al., "Priority Inheritance Protocols: An Approach to Real-Time Synchronization," IEEE Transactions on Computers, Sep. 1990, pp. 1175-1185, vol. 39, No. 9.

F. Siebert et al., "Eliminating External Fragmentation in a Non-Moving Garbage Collector for Java," Proc. CASES Nov. 2000, pp. 9-17, California.

C. Stephenson et al., "New Methods for Dynamic Storage Allocation," Proc. SOSP, SIGOPS Operating Systems Review, 17, 5, Oct. 1983, pp. 30-32.

M. Stonebraker et al., "An Economic Paradigm for Query Processing and Data Migration in Mariposa," Proc. International Conference on Parallel and Distributed Information Systems, 1994, pp. 58-68.

T. Yuasa, "Real-Time Garbage Collection on General-Purpose Machines," J. Systems and Software 11, Mar. 3, 1990, pp. 181-198.

B. Biron et al., "Real-Time Java, Part 4: Real-Time Garbage Collection," http://www.ibm.com/developerworks/java/library/j-rtj4/index.html, May 2, 2007, 15 pages.

\* cited by examiner

SCHEDULING FOR REAL-TIME GARBAGE COLLECTION

CROSS REFERENCE TO RELATED APPLICATION

The present application is related to the U.S. patent application identified as Ser. No. 12/252,798, entitled "Lock Deferral for Real-time Garbage Collection," filed concurrently herewith, the disclosure of which is incorporated by reference herein in its entirety.

FIELD OF THE INVENTION

The present invention is related to computing systems and, more particularly, to techniques for managing scheduling algorithms such as scheduling algorithms that perform garbage collection functions in such computing systems.

BACKGROUND OF THE INVENTION

In computer science, garbage collection is a form of automatic computer resource management. For example, a garbage collection module or system (garbage collector or GC) attempts to reclaim resources (e.g., memory) used by data objects that will not be accessed or manipulated again by a subject application program. The basic functionalities of a garbage collector include determining which data objects in a program will not be accessed in the future, and reclaiming the resources used by those objects.

Recent advances in real-time garbage collection (RTGC) have led to its production use in a number of significant application areas including, for example, financial trading, telecommunications, and military command-and-control.

There is a very wide variety of users interested in RTGC technology, with a wide variety of application characteristics and operating environments. Real-time applications may be periodic (e.g., avionics), queued (e.g., telecommunication switches), or interactive (e.g., video games).

Any of these systems may be either "hard" real-time or "soft" real-time. In a hard real-time system, such as heart monitors or defense systems, it is considered a catastrophic failure of the system when a deadline is missed. In soft real-time systems, missed deadlines can have adverse effects, such as a graphical use interface not displaying all results of a stream being monitoring, but do not constitute a system failure.

Classical real-time systems typically operate with a certain amount of slack. If there is no slack, then the system can not guarantee to meet its bounds. But interactive systems may become sluggish during bursts of other activity on the machine, and in some cases this is the desired behavior. Queued systems may absorb temporary load spikes and tolerate a certain fraction of outliers depending on a service-level agreement. The use of adaptive algorithms that compute successively more precise results until available slack is exhausted allows hard real-time systems to saturate the central processing unit.

Furthermore, there is a great deal of diversity in the operating environment. That is, the computing system may be uni-processor or multi-processor; the machine may be dedicated or shared; and the operating system may have varying levels of real-time support.

Currently, RTGCs only support a limited subset of the potential application types and operating environments.

SUMMARY OF THE INVENTION

Embodiments of the invention provide techniques for managing scheduling algorithms such as scheduling algorithms that, for example, perform garbage collection functions in computing systems.

By way of example, in one embodiment, a method for managing performance of tasks in threads associated with at least one processor comprises the following steps. One or more units of a first task type are executed. A count of the one or more units of the first task type executed is maintained. The count represents one or more credits accumulated by the processor for executing the one or more units of a first task type. One or more units of a second task type are executed. During execution of the one or more units of a second task type, a request to execute at least one further unit of the first task type is received. The amount of credits in the count is checked. When it is determined that there is sufficient credit in the count, the request to execute the at least one further unit of the first task type is forgone, and execution of the one or more units of the second task type continues. When it is determined that there is insufficient credit in the count, the at least one further unit of the first task type is executed.

The first task type may be an overhead task type such as a garbage collection task type, and the second task type may be an application task type.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the invention will be described herein in the context of a Java™ (Sun Microsystems of Santa Clara, Calif.) based real-time garbage collection environment. However, it is to be understood that principles of the invention may be more generally applicable to any computing environment wherein it would be desirable to improve scheduling algorithms.

In one illustrative embodiment, we propose a "tax-and-spend" scheduling methodology that significantly improves upon existing scheduling policies. Such an improved scheduling methodology will be described herein in the context of a real-time garbage collection system.

The tax-and-spend real-time garbage collection methodology of the invention provides for its collector be both incremental (e.g., breaking collection work into quanta lasting at most a few hundred microseconds) and concurrent (e.g., allowing collection to occur in parallel with application execution). To exploit multi-processors efficiently, the tax-and-spend real-time garbage collection methodology also provides for its collector to be parallel (e.g., allowing collection work to be done by multiple threads).

A non-concurrent incremental collector known as Metronome™ (IBM Corporation of Armonk, N.Y.) performs garbage collection with all application (also referred to as "mutator") threads paused for very short intervals. A description of the Metronome™ system is available in J. Auerbach et al., "Design and Implementation of a Comprehensive Real-time Java Virtual Machine," Proc. International Conference on Embedded Software (Salzburg, Austria, 2007), pp. 249-258, the disclosure of which is incorporated by reference herein in its entirety. Basic principles of the Metronome™ collection algorithm are described in D. F. Bacon et al., "A Real-time Garbage Collector with Low Overhead and Consistent Utilization," Proc. Symposium on Principles of Programming Languages (New Orleans, La., January 2003), SIGPLAN Notices, Vol. 38, No. 1, pp. 285-298, the disclosure of which is incorporated by reference herein in its entirety. Still further, details of Metronome™ are described in U.S. Patent Publication Nos. 2005/0149585, 2005/0149346, 2005/0149589, 2005/0149686, 2005/0149587 and 2006/0294165, the disclosures of which are incorporated by reference herein in their entirety.

Figure 1:
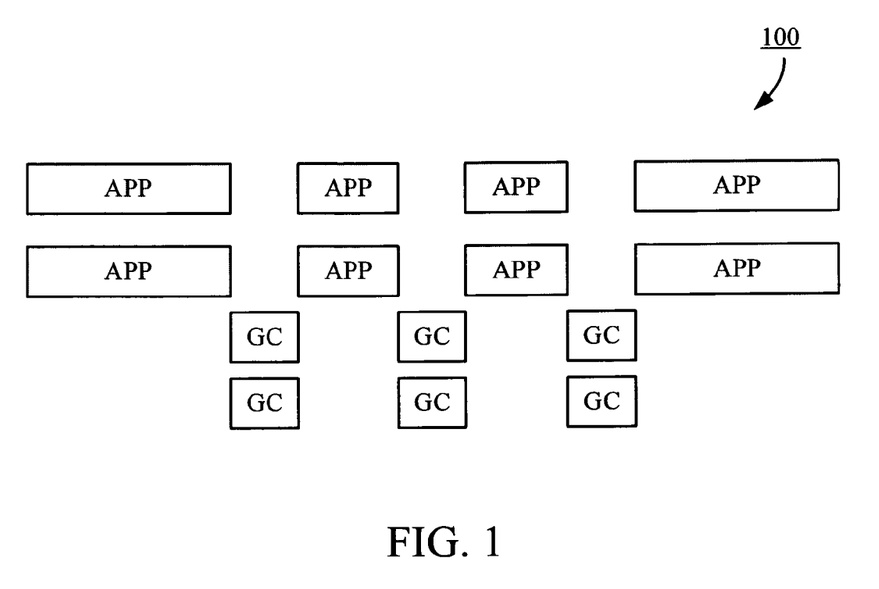
FIG. 1 illustrates operation of a garbage collector system.
Figure 2:
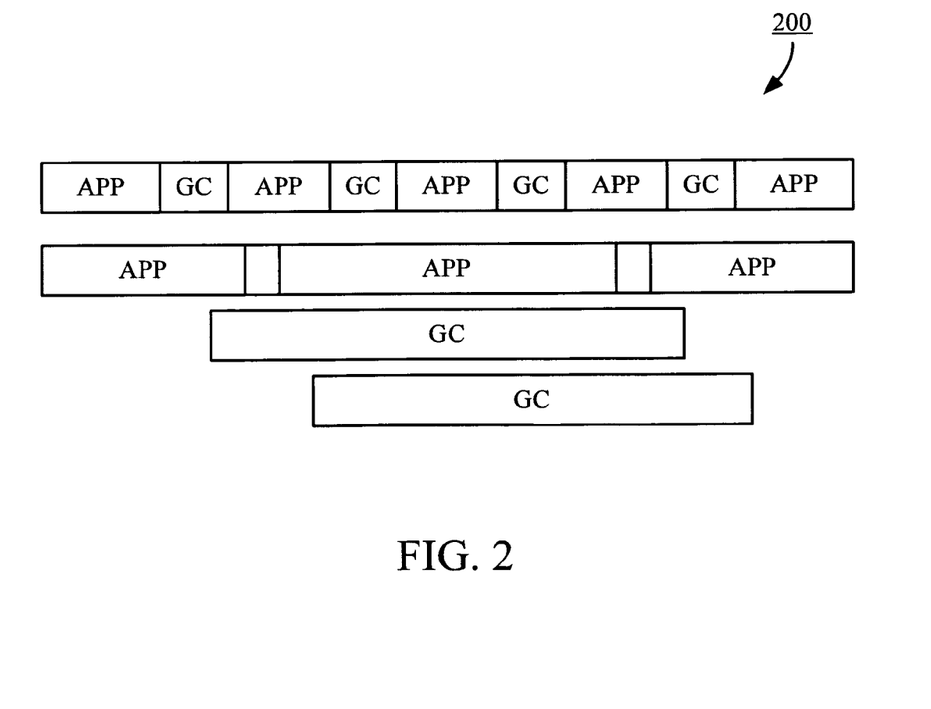
FIG. 2 illustrates operation of a garbage collection system, according to an embodiment of the invention.

This non-concurrent incremental approach of Metronome™ is illustrated in policy 100 of FIG. 1. FIG. 2 illustrates tax-and-spend collector policy 200 of the invention. Both figures show two mutator (application) threads and two dedicated garbage collection (GC) threads. As used herein, a "thread" is short for a "thread of execution" of a processor. Threads are a way for a computer program run by the processor to split itself into two or more simultaneously (or pseudo-simultaneously) running set of tasks. Also, as used herein, an "application" is computer program code that performs some function or task other than an overhead task such as garbage collection.

In Metronome™, all GC work is done on separate threads to facilitate fine-grained scheduling. The tax-and-spend approach of the invention makes two essential changes. First, GC work occurs on the GC threads concurrently with mutator execution. Second, when mutators do need to stop, they can be "taxed" by requiring them to perform short quanta of collector work themselves (but with different mutators doing this work at different times, concurrently with the execution of other mutators).

Taxation is needed when the degree of load on the system makes it essential to take small quanta of time explicitly from mutator threads. Concurrent collection by itself is insufficient, since it relies on the operating system to interleave GC activity with mutator activity, which does not provide enough scheduling precision to meet real-time guarantees and prevent heap exhaustion. Taxation also provides robustness to overload, as we will describe below.

In a Java™ Virtual Machine (JVM) implementation, taxation dictates frequent checks in the JVM's code paths for pending memory management work. The tax-and-spend garbage collector imposes taxation in the allocation "slow path" (the path taken by a mutator when it can not allocate from per-thread data structures and must replenish them from global data structures). This is supplemented when needed by forcing taxation at safe points, which are places where mutator stacks and program counters are consistent. To achieve safe point semantics, threads frequently check a flag in the thread's control structure, and if that flag is set, they invoke a safe point callback function. Thus, this callback mechanism is used to ensure that each thread (individually) is taxed fairly and does critical tasks in a timely fashion.

Generally speaking, the tax-and-spend scheduling methodology dictates that a collector is at least both concurrent and highly incremental (with maximum collection quanta well below the worst case execution time of the intended workload). For good performance on multiprocessors, even with modest numbers of processors, the capability to perform collection in parallel is also required. The tax-and-spend garbage collector of the invention has all three properties: it is concurrent, parallel, and highly incremental (down to a granularity of about 200 microseconds).

Immediately below, we now describe some algorithms that may be used to make the already incremental Metronome™ into the tax-and-spend garbage collector of the invention (we will refer to the inventive garbage collector as "TS-GC"). It is to be appreciated that the invention is not limited to use in a Metronome™ garbage collector. That is, one ordinarily skilled in the art will be able to implement a tax-and-spend garbage collector, independent from the Metronome™, based on the detailed description herein.

In any parallel or concurrent collector, there will be a requirement for agreement amongst threads, including mutator threads. In Metronome™, agreement was readily achieved (as long as it could be achieved in a time shorter than the GC quantum) since the collector had exclusive control when doing GC work and all mutators were paused at safe points.

TS-GC may substitute a ragged epoch protocol in places where Metronome™ relied on exclusive control to achieve agreement. The protocol relies on a single global epoch number that can be (atomically) incremented by any thread, and a per-thread local epoch number. Each thread updates its local epoch by copying the global epoch, but it does so only at safe points. Thus, each thread's local epoch is always less than or equal to the global one. Any thread can examine the local epochs of all the other threads and find the least local epoch value, called the confirmed epoch. The confirmed epoch is always less than or equal to the global epoch.

Suppose thread A has performed some operation that establishes a new state of the memory management system (for example, it has enabled a store barrier that must be honored by all mutator threads during the next phase of the collection). Thread A then increments the global epoch and notes the result. Only when the confirmed epoch equals (or passes) this remembered value can A be certain that no thread is computing with a too-early view of the state (e.g., a view in which the store barrier is not enabled). For hardware with weak memory ordering, it is necessary for a thread to insert a memory barrier prior to updating its local epoch.

Implementing this protocol involves one subtlety. Waiting for all threads' local epochs to catch up can be delayed indefinitely when some threads are in input/output (I/O) waits. However, all such waits occur in native methods. When the JVM detects that a thread is entering a native method, it ensures that the thread is at a safe-point and releases the thread's VM Access property. Threads without VM Access do not have access to any JVM data structures and can be thought of as potentially up to date with the global epoch (they will copy it as soon as they reacquire VM Access and before doing anything to make their view of the memory management system inconsistent).

Thus, the confirmed epoch is calculated using only threads with VM Access. There is then a short window during which a thread may have just regained VM Access but not yet updated its local epoch. These briefly laggard local epochs are rendered harmless by remembering the previous confirmed epoch while calculating the new one and not allowing the confirmed epoch to move backwards.

Threads may also lag due to overload or priority pre-emption. This is handled by the boosting mechanism described below.

Garbage collection is inevitably divided into phases like marking and sweeping. In the architecture described here, there are more such phases than one might at first think, due to two factors. First, to achieve incrementality, everything must be broken down into small steps. A conceptually unified action (such as effecting the transition from marking to sweeping), gives rise to many distinct actions. Second, the full Java™ language has constructs, such as finalization, weak and soft references, and string interning, which interact in complex ways with memory management. These constructs add phases to the collection cycle. For example, reference clearing can only be considered once marking is over and it is known which objects are reachable. In one embodiment of TS-GC, there may be more than thirty phases in the collection cycle.

We require agreement on when one phase of a collection ends and another begins. Metronome™ achieved such agreement readily because all GC work occurred on dedicated threads which could block briefly as long as enough time remained in the GC quantum. In TS-GC, the agreement mechanism must be strictly non-blocking because some of the work is being done by mutator threads, each of which can be at a different point within its taxation quantum. The ragged epoch mechanism was not efficient for this form of agreement since it did not distinguish threads currently doing GC work from other irrelevant threads. Instead, TS-GC we employs a "last man out" protocol for phase transition agreement. The protocol works by storing a phase identifier and a worker count in a single atomically updatable location.

When a mutator thread is potentially eligible for taxation, it atomically increments the worker count, leaving the phase identifier the same. When a mutator exhausts the work quantum while there is still work left to do in the phase, it atomically decrements the worker count, also leaving the phase identifier the same. When any thread detects that there is (apparently) no more work left in the phase and also that the current worker count is one, the exiting worker changes the phase atomically with decrementing the worker count to zero. This establishes the new phase.

The last man out protocol is a sound basis for phase transition as long as there is no "invisible work" (that is, there is some global work queue and any incomplete work is returned to that queue when a worker exits). Eventually, there will truly be no more work to do and some thread will end up being the last man out and able to declare the next phase.

The requirement of making all work visible to the last man out in a parallel phase is easily met except in one case. This special case is the termination of the marking phase. The Metronome™ collectors use Yuasa's snapshot-at-the-beginning technique [T. Yuasa, "Real-time Garbage Collection on General-purpose Machines," J. Systems and Software, Vol. 11, No. 3 (March 1990), pp. 181-198, the disclosure of which is incorporated by reference herein), and hence they rely on a write barrier. For that reason, termination of marking requires coordinated checking of the barrier buffer in conjunction with the normal work queue. This coordinated checking is difficult to accomplish in a distributed fashion across multiple worker threads. Consequently, when marking "appears to be over," as observed by individual threads, there is a transition to a phase in which marking is temporarily handled by one thread, which uses the ragged epoch mechanism to detect whether there is global agreement that all write buffers are empty. The deciding thread can declare a false alarm and return to parallel marking. Eventually termination conditions are met (since snapshot algorithms are inherently bounded and monotonic) and the single deciding thread moves to the first post-marking phase.

While most phases of a collection cycle just need enough worker threads to make progress, some require that something be done by (or to) every mutator thread. At the start of collection, every thread's stack must be scanned. At other times, thread-local caches must be flushed to make information visible to the collector. To support this capability, some phases are marked as callback phases. As soon as there is agreement that the collection is in a callback phase, a distinct callback protocol takes temporary precedence over last man out.

In a callback phase, a GC master thread frequently examines all mutator threads to see whether they have accomplished the required task. For each thread that has not, a different action is taken depending on whether the thread has VM Access. Threads with VM Access are requested to call back at their next safe point and to perform the required action (stack scanning, cache flushing, etc.) on themselves. Threads that do not have VM Access are briefly prevented from reacquiring VM Access while the callback action is performed on their behalf by a GC thread. Thus, the maximum delay imposed on any thread during a callback phase is the time taken to perform the action, regardless of whether the thread does or does not have VM Access at the time the phase begins. Threads without VM Access are often in I/O waits and hence there is a good chance that the thread will avoid delay entirely.

Progress is a fundamental requirement for a real-time collector, because it must finish collection before the heap is exhausted. All three of the protocols we have proposed for TS-GC (ragged epochs, last man out, and callback) can have their progress impaired when a thread that needs to be heard from has a lower priority than other threads that are monopolizing the available processors. This problem is a case of the well-known priority inversion phenomenon, but common solutions such as priority inheritance are not applicable because garbage collection is a complex global operation lacking a single kernel-managed resource. Instead, we use the kernel's manual priority setting mechanism to boost the priorities of threads that are delaying progress and then revert them to their normal priority as soon as possible thereafter.

Another kind of priority inversion may occur when a mutator thread has to perform collector work while holding a Java™ lock. We describe this in more detail below along with a solution in Section II entitled LOCK DEFERRAL. We now more fully describe the tax-and-spend scheduling methodology (i.e., that is employed in a TS-GC) in Section I entitled TAX-AND-SPEND SCHEDULING.

I. Tax-and-Spend Scheduling

We now present a new approach to scheduling of real-time garbage collection that is sufficiently flexible and general to handle the variations in both application types and system configurations that we described above.

Our approach provides a clean policy/mechanism separation and subsumes time-based, work-based, and slack-based schedulers. It also allows a simple default configuration which is robust and performs well for the majority of users.

a. Minimum Mutator Utilization

In one illustrative embodiment, collector scheduling in TS-GC uses a minimum mutator utilization (MMU) metric. The MMU metric is described in P. Cheng et al., "A Parallel, Real-time Garbage Collector," Proc. SIGPLAN Conference on Programming Language Design and Implementation (Snowbird, Utah, June 2001), SIGPLAN Notices, Vol. 36, No. 5 (May), pp. 125-136, the disclosure of which is incorporated by reference herein in its entirety. The MMU of a system at time resolution w, MMU(w), is defined as the minimum fraction of time available to mutator(s) over any time window of size w during the entire execution of the system.

Thus, if a task with a deadline d and a worst-case execution time e (where e<d) runs during garbage collection, it will meet its deadline if MMU(d)≧e/d.

MMU is simple for users to reason about because they can just consider the system as running somewhat slower than the native processor speed until the responsiveness requirements become very close to the quantization limits of the collector.

As a metric, MMU is superior to maximum pause time, since it accounts for clustering of individual pauses, which can cause missed deadlines and pathological slowdowns.

As described below, TS-GC uses MMU in a general way where different threads may run at different MMUs, background threads on spare processors may be used to obtain very high MMUs on mutator threads, and the units of time can be either physical or virtual.

b. Per-Thread Scheduling

A key aspect of our system is that measurement and scheduling of collector work is driven using per-thread metrics, and collector quanta may be performed on mutator threads. This has a number of advantages.

First, by way of example, performing collector quanta on mutator threads allows all collector-related activity to be tracked and accounted for, even things that of necessity occur on mutator threads (such as obtaining a new write buffer, formatting a page, and so on). It may be arguable whether these operations are part of "garbage collection." However, they are memory management operations that perturb mutator execution and therefore the scheduler should track them so that it avoids scheduling too much work on that thread.

By way of a further example of an advantage, by performing collector quanta on mutator threads, we avoid perturbations of the scheduler caused by operating system assumptions about how it should behave when a thread voluntarily yields, particularly when the collector is scheduled at a considerably finer quantum size than the operating system (in the illustrative case, 200 microseconds rather than 10 milliseconds). For example, say we are attempting to interleave one collector and one mutator thread at 200 microsecond granularity. In an unloaded system, this generally works well. But in a loaded system, the operating system will assume that since both threads "voluntarily" (from its point of view) yielded the CPU, they are done with their operating system quanta, and it may run some other unrelated thread for its full 10 milliseconds. With round-robin scheduling, this will lead to the JVM getting only 4 percent of the CPU, instead of 50 percent. By interleaving at a fine granularity on the mutator thread, such effects are avoided and the two schedulers operate in a more orthogonal and compositional manner.

By way of another example of an advantage, performing collector quanta on mutator threads allows different threads to run at different utilization levels, providing flexibility when allocation rates vary greatly between threads, or when particular threads must be interrupted as little as possible (for instance, on interrupt handlers).

Finally, by way of example, performing collector quanta on mutator threads allows quantization overhead to be reduced for threads with less stringent timing requirements.

c. Tax-Based Versus Slack-Based Scheduling

The most fundamental distinction between approaches to scheduling real-time collection is between tax-based and slack-based. In a slack-based scheduler, exemplified by the real-time collector of Henriksson (see R. Henriksson, "Scheduling Garbage Collection in Embedded Systems," PhD thesis, Lund Institute of Technology, July 1998, the disclosure of which is incorporated by reference herein in its entirety), the collector runs during "slack" periods when the mutator threads have voluntarily yielded the processor. There may also be additional low-priority mutator threads that run when neither collector nor high-priority mutator threads are running.

Slack-based scheduling uses a paradigm familiar to programmers of classical periodic real-time systems and works very well in such an environment. However, it can cause catastrophic failure in overload situations, and it is thus poorly suited to queued, adaptive, or soft interactive real-time systems.

On the other hand, a tax-based scheduler periodically interrupts the mutator to perform a certain amount of work on behalf of the collector. Tax-based schedulers include both the work-based approach used by Baker (see H. G. Baker, "List Processing in Real-time on a Serial Computer," Commun. ACM, Vol. 21, No. 4 (April 1978), pp. 280-294, the disclosure of which is incorporated by reference herein in its entirety) and many subsequent incremental and real-time collectors, as well as the time-based approach as exemplified by the Metronome™ collector.

In a work-based system, a certain amount of collector work is performed every time the mutator performs a certain number of memory-related operations (allocation, read barriers, or write barriers). The amount of collector work is chosen to be proportional to the mutator work such that collection will finish before memory is exhausted.

Work-based scheduling is relatively simple to implement and does not rely on real-time operating facilities such as high-precision timers. However, it often suffers from poor MMU and considerable variation in pause times. Thus, work-based scheduling is unsuitable for any but the "softest" of real-time systems.

Time-based scheduling taxes the mutator thread based on the passage of physical time by directly honoring an MMU requirement (MMU(w)=u) and interleaving mutator and collector activity for given amounts of physical time.

Time-based scheduling allows simple but reliable reasoning about the timing behavior of the system. It works well for queued, periodic, and interactive real-time systems and is robust in the presence of overload because taxes continue to be assessed. Reasoning about timely completion is simpler than with a slack-based scheduler, but somewhat more complex than with a work-based collector (although in practice we have found that the vast majority of applications work with an MMU of 70%). However, in a system with slack, it introduces more jitter than a slack-based collector, since collection may occur at any point so long as MMU requirements are obeyed. It also requires high-precision timing facilities.

d. Unifying Tax and Slack Scheduling

Since both tax-based and slack-based scheduling have desirable properties, we propose to unify them in a single mechanism that combines their advantages and allows the application of various policies.

We unify the two mechanisms using an economic analogy: each mutator thread is subject to a tax rate, which determines how much collection work it must perform for a given amount of execution. This is expressed as a per-thread MMU. Dedicated background GC threads at low or idle priority can run during slack periods and accumulate credits for the work they perform. In our system, credits are deposited in a single centralized bank account, but more flexible (and complex) policies could make use of multiple bank accounts.

Each thread has its own tax rate (MMU), and the aggregate tax must be sufficient for the garbage collector to finish garbage collection before the system runs out of memory. While the mechanism allows each thread to have an individual MMU, by default all threads have the same MMU.

e. Using Slack: Background Threads

The system has some number of collector background threads, usually not more than the number of processors. In practice, background threads are often run at idle priority or are otherwise configured to only run when a CPU is idle. In this way, they naturally run during slack periods in the overall system execution.

Background threads execute collector work in a series of work quanta. For each quantum that the background thread executes, it adds the corresponding amount of credit to the bank account.

Figure 3A:
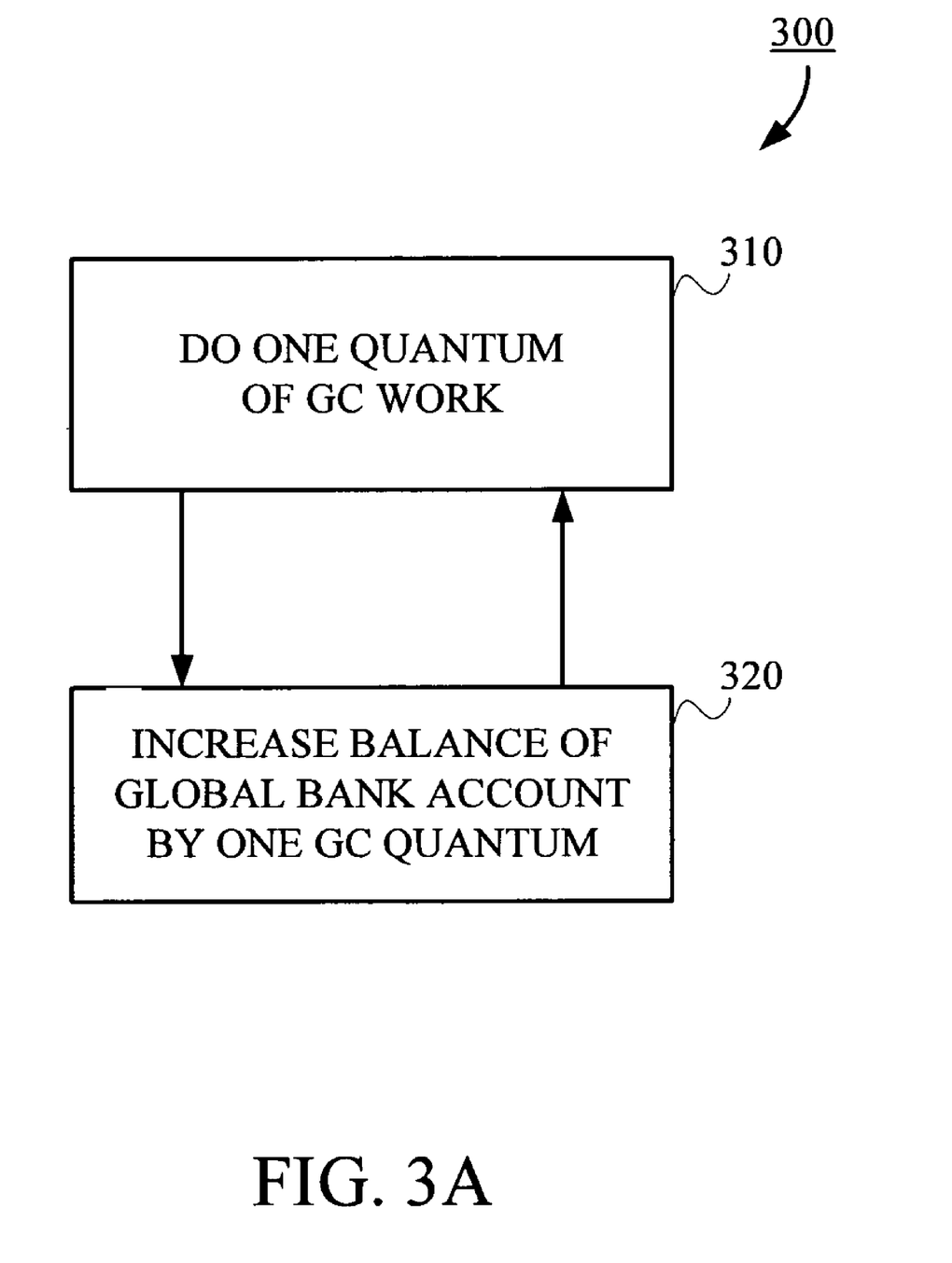
FIG. 3A illustrates one part of a scheduling methodology, according to an embodiment of the invention.

This is illustrated in FIG. 3A. As shown, GC background thread protocol 300 provides for one quantum of garbage collection (GC) work to be performed in step 310. In step 320, the balance of the so-called global bank account is increased by one GC quantum.

It is to be appreciated that in terms of the one or more computer systems that serve to implement the protocol, increasing the so-called credit balance may be realized by incrementing a register that represents a running count of the GC quanta performed.

Alternatively, one could keep the "global bank account" or "credits account" in a shared memory location and increment/decrement either via atomic memory operations or by guarding the increment/decrement with a lock. One could also implement a distributed "banking system" where a multiplicity of credit accounts were maintained, each for a subset of the threads in the system, and such that those accounts are loosely kept in balance by having each bank infrequently lend/borrow credits from each other.

In a preferred operating system targetable for use with TS-GC (the RHEL5 MRG real-time Linux kernel), it is desirable to assign a low real-time priority to the background threads rather than running them at Linux's SCHED_OTHER priority. This causes them to be scheduled with a quantum similar to that used by other threads and allows them to exploit idle processors more efficiently. When run at real-time priority, the background threads periodically sleep for a small amount of time. This has a minimal effect on the progress of the collector but makes it possible for ordinary (SCHED_OTHER) processes to make progress even when collection within the JVM might otherwise saturate the machine. This is particularly important since it makes it possible for users to log on and end runaway real-time processes.

f. Paying Tax: Mutator Threads

The MMU of each mutator thread specifies its maximum tax rate and the granularity at which the rate is applied. Note that the MMU does two things. On the one hand, it ensures that the application can meet its real-time requirements by guaranteeing that the mutator can make sufficient progress in a time window. On the other hand, it allows for the collector to make sufficient progress so that it can complete on time.

One approach is for the thread to pay its own tax as it goes, as in a basic tax-based system: it alternately performs mutator work and collector quanta. However, under the tax-and-spend discipline, when a mutator thread is running and the time comes to assess garbage collection tax, the application first attempts to withdraw a quantum's worth of credit from the bank. If this operation succeeds, the collector is "ahead" and the mutator can skip its collection quantum and return immediately to mutator tasks (i.e., it spends credits deposited in the bank by background threads to pay its GC tax). If this operation fails, then the mutator must do GC work itself to accumulate enough credit to pay the tax. Thus, the mutator only pays tax when there is insufficient collection being performed during slack periods. More generally, if only a partial quantum's worth of credit is available, it can perform a smaller collection quantum and return to the mutator more quickly. The result is that, in the presence of slack, the mutator runs with both higher throughput and lower latencies but without the danger of the collector falling behind. Furthermore, it can also take advantage of partial slack.

Figure 3B:
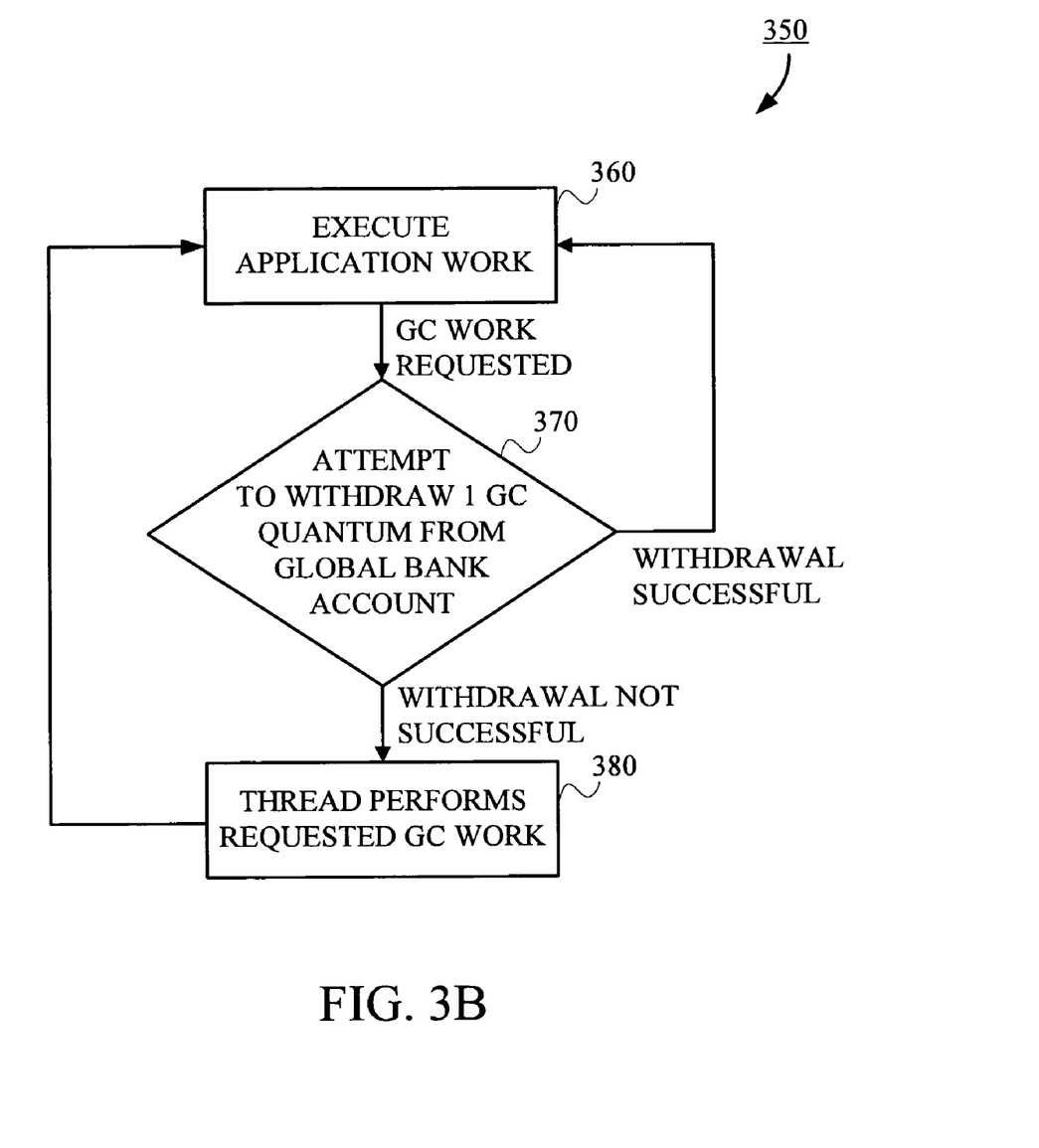
FIG. 3B illustrates another part of a scheduling methodology, according to an embodiment of the invention.

This is illustrated in FIG. 3B. As shown, application thread protocol 350 provides for the application (mutator) to execute its tasks (step 360). If a GC task is requested, an attempt is made to withdraw one GC quantum from the global bank account (step 370). If there is a quantum to be withdrawn (i.e., the counter is not zero), then the withdrawal is successful and the thread goes back to performing its own work (back to step 360).

However, if the request by the thread to withdraw is unsuccessful because there are no credits accrued (i.e., counter is zero), then the thread performs the requested GC work (step 380). After the GC work is completed, the thread returns to step 360 to execute application work.

Tax-and-spend also allows us to treat slack in a uniprocessor and excess capacity in a multiprocessor in a uniform way. If there are four processors and three mutator threads, then a collector thread can run on the fourth processor and bank enough credits that the three threads never have to perform work on behalf of the collector.

But if the tax rate does not divide evenly into the number of processors (for example, a 70% MMU on four processors would require 1⅕ collector processors), a small amount of collection work will be imposed on the threads running on the other three processors. However, they will still be taxed in such a way that their MMU requirements are met.

g. Unifying Time and Work Scheduling

So far we have described the taxation in terms of MMU over time, thus implementing time-based scheduling. However, we can unify both time-based and work-based scheduling by treating work as a different way of measuring time. Thus, time is virtualized and can be measured in absolute physical time, per-thread CPU time, bytes allocated, safe points executed, and so on. Different choices of virtual time axes yield schedules with different tradeoffs in terms of timing precision, overhead, and stringency of requirements on the hardware and operating system.

In fact, even in time-based mode, TS-GC uses per-thread CPU time rather than absolute physical time. There are two reasons for this. First of all, since we are performing per-thread scheduling, global time will not work reliably in overload situations and may make the feasibility analysis complex if portions of the system are delayed for non-deterministic amounts of time in blocking system calls (such as I/O waits). Second, and more importantly, it allows users to reason more compositionally about the scheduling behavior of the operating system versus the scheduling behavior of the Java™ virtual machine.

h. Oversampling

The original Metronome™ collector, when given an MMU requirement of MMU(w)=u, would schedule one collector quantum of size $w \cdot (1-u)$ every w time units. However, this has three disadvantages. First, any small amount of jitter or overshoot in the scheduler quantum will cause an immediate MMU failure. Second, if the system is capable of using smaller quanta, then users will not receive the improved average-case latency at shorter time scales that may have significant benefits for applications like queued real-time systems.

And third, it requires more careful consideration of MMU requirements, complicating the interface for naïve users.

Thus, TS-GC makes use of oversampling, a technique in which higher fidelity is achieved by using a higher frequency for digital processing than the final output frequency requirement.

Oversampling provides both more accurate MMU at the chosen time window as well as higher (albeit not as tightly guaranteed) MMU at shorter time windows, and it allows much more broadly applicable default settings for the collector.

II. Lock Deferral

The combination of oversampling and per-thread MMU based scheduling gives TS-GC the opportunity to dynamically adjust how GC work is scheduled to be sensitive to application critical sections. The basic scheduling algorithm can be extended as described below to reduce the worst-case execution time of critical sections in certain types of real-time programs by briefly deferring GC work.

For this extension to be applicable, the work of the application must be composed of critical and non-critical sections. It works well when the critical sections are short (shorter or similar in length to a GC quantum) and, at the time scale of a GC scheduling window, there must be sufficient flexibility (due either to idle time or non-critical section work) to make it feasible to schedule the required GC work outside of the critical sections.

A key observation is that oversampling divides an MMU time window into a number of smaller units at which GC operations are scheduled. For example, a 4 millisecond MMU window with 200 microsecond GC quanta can be divided into 20 scheduling units. With a 70% MMU target, the system should schedule GC work in 6 of these units and allow the thread to execute unperturbed in the other 14. As long as the MMU-derived scheduling constraints are met (both in this window and in the nearby windows), there is flexibility in scheduling the GC work. In particular, if the thread is in a short critical section when the system decides to schedule GC work on the thread, the work could instead be deferred until immediately after the critical section without significantly changing the thread's MMU or the GC's forward progress.

A key implementation issue is to dynamically balance the competing goals of avoiding GC work in critical sections, thus improving the predictability of the application, and scheduling sufficient GC work on the thread, thus ensuring that the GC completes in a timely fashion. We again do this by applying a banking model (i.e., a register storing a counter value).

Each thread has a private critical section deferral account that is initialized to a GC quantum worth of credits (using the example values above: 200). If the thread is in a critical section when it is asked to perform GC work and it has a positive credit balance, then it is marked as having deferred GC work and is allowed to resume normal execution. When it exits the critical section, its balance is debited by the time the GC work was deferred and it immediately fulfills its GC obligation. If the critical section is long, the thread is asked to perform GC work again before it exits the critical section. If, after deducting the time since it initially deferred the work, its balance is no longer positive then the deferral is canceled. Each time the thread performs GC work, it receives a small credit to its critical section balance.

Figure 4:
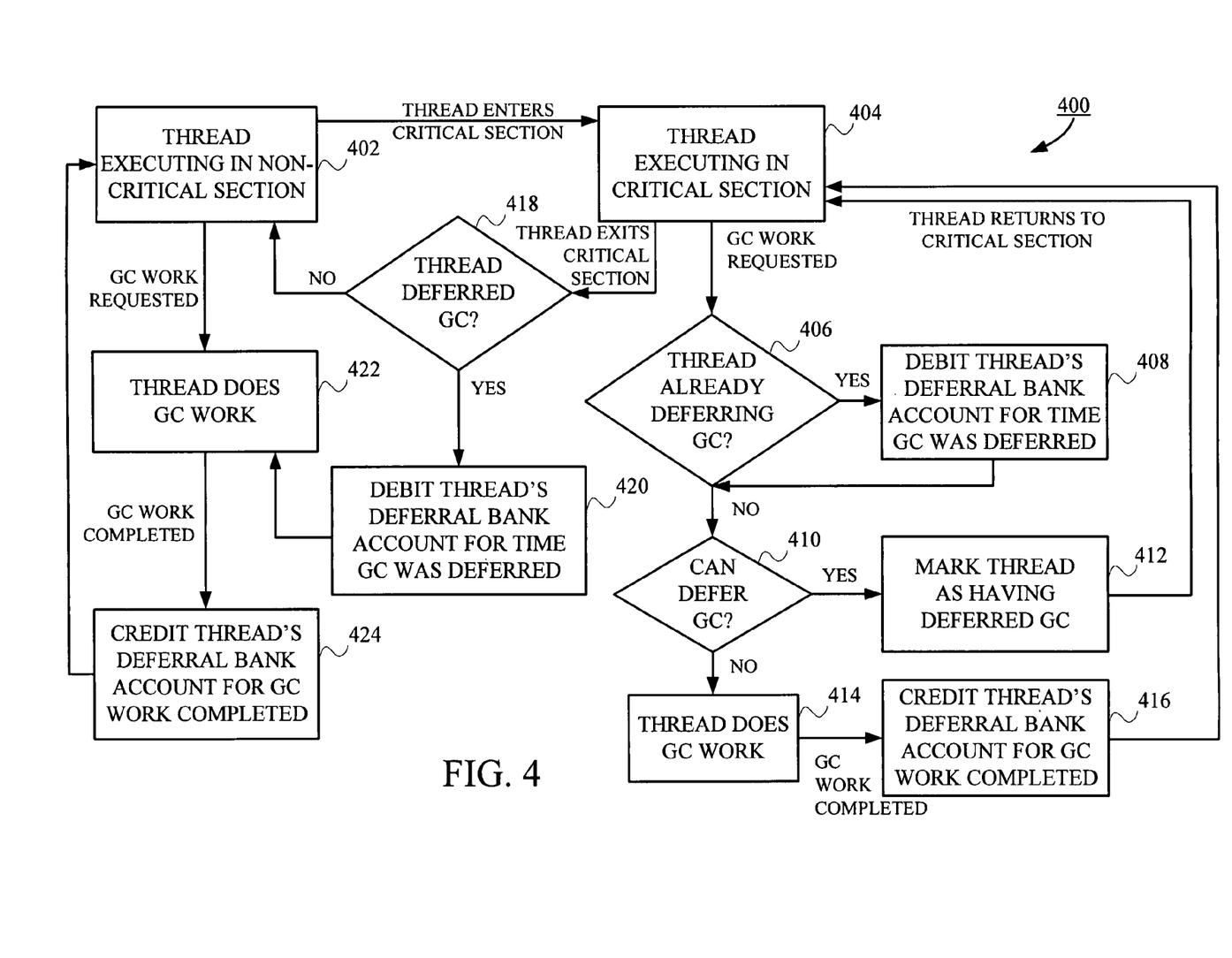
FIG. 4 illustrates a lock deferral methodology, according to an embodiment of the invention.

This is illustrated in FIG. 4. As shown in scheduling protocol 400, assume that the subject thread is executing in a non-critical section (step 402). Assume then that the thread then enters execution in a critical section (step 404).

If GC work is requested, the protocol checks whether the thread is already deferring GC work (step 406). If yes in 406, the protocol debits the thread's deferral bank account for time GC was deferred (step 408) and proceeds to step 410. If no in 406, the protocol checks whether GC can be deferred (step 410). If yes in 410, the thread is marked as having deferred GC work (step 412) and protocol returns to block 404 (i.e., to critical section). If no in 410, the thread does the GC work (step 414). After the GC work is completed, the thread's deferral bank account is credited for GC work completed (step 416) and protocol returns to block 404 (i.e., to critical section).

In the situation when the critical section is completed and the thread exits the critical section, the protocol checks whether the thread deferred GC work (step 418). If no in 418, the thread then goes on to execute next non-critical section (step 402). If yes in 418, the protocol debits thread's deferral bank account for time GC was deferred (step 420).

In step 422, the thread does GC work (step 422). That is, it can do GC work deferred during critical section or GC work requested during non-critical section. Upon completion of GC work, the protocol credits the thread's deferral bank account for the GC work completed (step 424).

In a preferred implementation, we bound the allowable values of the critical section balance to be within 1 GC quantum of zero and give credits at a rate such that an entire GC quantum of credit can be earned in a scheduling window. Using the numbers above, the balance is bounded between −200 and 200 and each time the thread does a quantum of GC work it gets a credit of 33 (200/6).

In one embodiment, we used the simple heuristic that critical sections are indicated by the thread holding a Java-level monitor. The JVM's monitor enter/exit sequences were augmented to increment/decrement a per-thread nesting count and to call into the GC when a thread that was marked as having deferred GC work exits its outermost locked region. However, it is to be appreciated that other mechanisms for determining critical sections may be employed.

Again, it is to be understood that while the above-described protocols are described in the context of GC tasks (or, more generally, overhead tasks) and application tasks, these principles of the invention may be applied to scheduling of any first task types and second task types.

Figure 5:
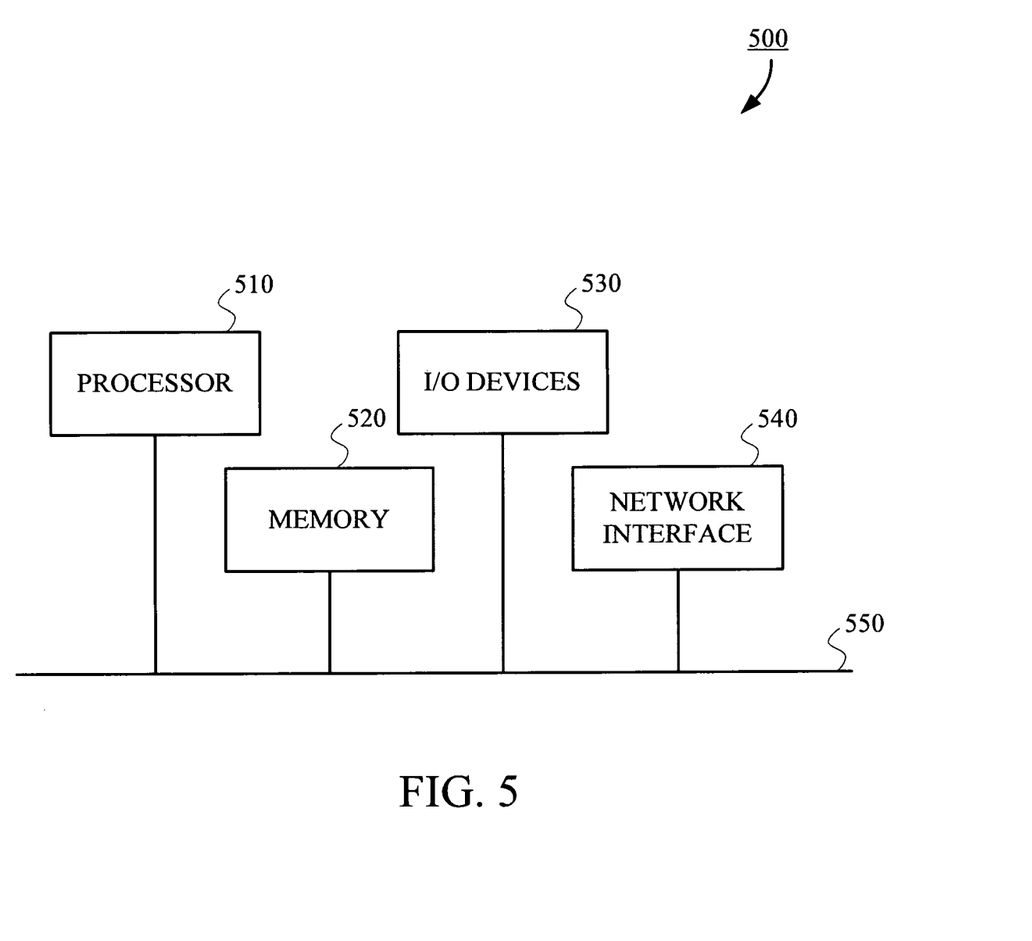
FIG. 5 illustrates a computer system within which scheduling and deferral methodologies may be implemented, according to an embodiment of the invention.

Referring lastly to FIG. 5, an exemplary implementation 500 of a computing system in accordance with which one or more components/methodologies of the invention (e.g., components/methodologies described in the context of FIGS. 2-4) may be implemented is depicted, according to an embodiment of the present invention. For example, the exemplary implementation may represent the computing system used to implement the scheduling protocols that control performance of mutator tasks (application work) and garbage collection tasks (GC work), as described above.

As shown, the methodologies described herein may be implemented in accordance with a processor 510, a memory 520, I/O devices 530, and a network interface 540, coupled via a computer bus 550 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. It is understood that a memory device mentioned here is example of "computer readable storage medium," which may constitute an article of manufacture when software instructions or code for implementing techniques of the invention are stored for execution thereon.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Thus, as mentioned above, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing performance of tasks in threads associated with at least one processor, comprising the steps of:
    executing one or more units of a first task type, wherein the step of executing the one or more units of the first task type is performed by the processor within a first thread;
    maintaining a count of the one or more units of the first task type executed, the count representing one or more credits accumulated by the processor for executing the one or more units of a first task type;
    executing one or more units of a second task type, wherein the step of executing the one or more units of the second task type is performed by the processor within a second thread, wherein the first and second task types are different;
    during execution of the one or more units of a second task type, receiving a request to execute at least one further unit of the first task type;
    checking the amount of credits in the count;
    when it is determined that there is sufficient credit in the count, foregoing the request to execute the at least one further unit of the first task type and continuing to execute the one or more units of the second task type; and
    when it is determined that there is insufficient credit in the count, executing the at least one further unit of the first task type.

2. The method of claim 1, further comprising the step of updating the count to reflect credit accumulated by the execution of the at least one further unit of the first task type.

3. The method of claim 1, wherein the request to execute the at least one further unit of the first task type is a request to execute the at least one further unit of the first task type within the second thread.

4. The method of claim 1, wherein execution of the one or more units of the first task type are performed by the processor within multiple threads.

5. The method of claim 1, wherein execution of the one or more units of the second task type are performed by the processor within multiple threads.

6. The method of claim 1, wherein the execution of at least one of the one or more units of the first task type are performed by the processor concurrent with the processor performing at least one of the one or more units of the second task type.

7. The method of claim 1, wherein a time to perform a unit of the first task type is smaller than a time to perform a unit of the second task type.

8. The method of claim 1, wherein the time to perform a unit of either the first task type or the second task type is based on a minimum utilization metric.

9. The method of claim 1, wherein there is sufficient credit in the count when the amount of previously accumulated credits is greater than or equal to the amount of further units of the first task type for which execution is requested.

10. The method of claim 1, wherein there is insufficient credit in the count when the amount of previously accumulated credits is less than the amount of further units of the first task type for which execution is requested.

11. The method of claim 1, wherein the first task type is a garbage collection task type and the second task type is an application task type.

12. An article of manufacture for managing performance of tasks in threads associated with at least one processor, the article comprising a computer readable storage medium including one or more computer programs which, when executed, enable the processor to perform the steps of claim 1.

13. Apparatus, comprising:
    a memory; and
    at least one processor coupled to the memory and configured to perform tasks in threads in accordance with a scheduling policy that comprises:
    executing one or more units of a first task type;
    maintaining a count of the one or more units of the first task type executed, the count representing one or more credits accumulated by the processor for executing the one or more units of a first task type;
    executing one or more units of a second task type;
    during execution of the one or more units of a second task type, receiving a request to execute at least one further unit of the first task type;
    checking the amount of credits in the count;
    when it is determined that there is sufficient credit in the count, foregoing the request to execute the at least one further unit of the first task type and continuing to execute the one or more units of the second task type; and
    when it is determined that there is insufficient credit in the count, executing the at least one further unit of the first task type,
    wherein the one or more units of the first task type are executed within a first thread, the one or more units of the second task type are executed within a second thread, and wherein the first and second task types are different.

14. The apparatus of claim 13, wherein the request to execute the at least one further unit of the first task type is a request to execute the at least one further unit of the first task type within the second thread.

15. The apparatus of claim 13, wherein execution of at least one of the one or more units of the first task type and the one or more units of the second task type are performed within multiple threads.

16. The apparatus of claim 13, wherein the execution of at least one of the one or more units of the first task type are performed concurrent with performing at least one of the one or more units of the second task type.

17. The apparatus of claim 13, wherein the first task type is a garbage collection task type and the second task type is an application task type.

18. A method for managing garbage collection in a computing system, comprising the steps of:
- maintaining an account of the amount of units of garbage collection work that are executed, the count representing one or more credits accumulated for executing the one or more units of the garbage collection work by a processor within a first thread;
- executing one or more units of application work by the processor within a second thread during execution of the one or more units of application work, receiving a request to execute at least one further unit of garbage collection work;
- checking the amount of credits in the account;
- when it is determined that there is sufficient credit in the account, foregoing the request to execute the at least one further unit of garbage collection work and continuing to execute the one or more units of application work; and
- when it is determined that there is insufficient credit in the account, executing the at least one further unit of garbage collection work.

* * * * *